Patented Oct. 10, 1950

2,525,568

UNITED STATES PATENT OFFICE 2,525,568

PROCESS OF MAKING C₁₈ UNSATURATED KETONE RELATED TO VITAMIN A

David Adriaan van Dorp and Josef Ferdinand Arens, Oss, Netherlands, assignors to Organon, Inc., Orange, N. J., a corporation of New Jersey No Drawing. Application February 5, 1946, Serial No. 645,699. In the Netherlands September 7, 1945

1 Claim. (Cl. 260—586)

This invention relates to certain unsaturated ketones derived from β-ionone which bear structural relationship to vitamin A and some of which are either active themselves or important intermediates in the synthesis of active compounds. The new ketones are characterized by the general formula $$R=X-\overset{R_1}{\underset{|}{C}}=O$$

in which R stands for the β-ionylidene group

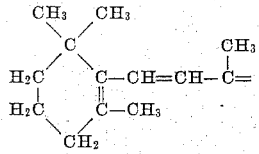

X stands for an unsaturated hydrocarbon group containing a carbon chain in which double bonds are arranged in such a way, that a continuous series of conjugated double bonds exists between those in R and the one in the C=O-group;

$R_1$ is an alkyl group, preferably a methyl group.

The following three ketones will be described in the examples, although the invention is not limited thereto:

1.   

which we shall designate as "the C₁₆-ketone";

2.   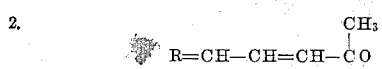

designated as "the C₁₈-ketone";

3.   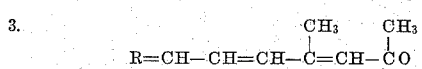

designated as "the C₂₁-ketone."

A compound to which was assigned the structure of "the C₁₆-ketone" (Formula 1) has been described by Karrer et al., who condensed the acid chloride of ionylidene acetic acid with methyl zinc iodide (Helv. Chim. Acta 17, 3 (1934)). Their product has an odour similar to that of β-ionone, and does not yield a crystalline semicarbazone. Our product is practically odorless, and gives a crystalline semicarbazone. M. P. 159.5°, 160.5° C.

Probably Karrer's product was a mixture of several isomers, as the acid chloride was prepared not from the crystalline ionylidene acetic acid but from a mainly liquid mixture of isomers as obtained by the condensation of β-ionone with ethyl bromoacetate and subsequent saponification. Although there may have been some genuine "C₁₆-ketone" in Karrer's product, there is no proof that this was in fact the case.

A compound of the supposed structure of Formula 2 has been described by Heilbron and co-workers (J. Chem. Soc. 1936, 561). Their compound crystallizes and melts at 144° C. which is improbably high for a ketone from this group. By condensation with ethyl bromoacetate and zinc they converted their product into an ester which was devoid of vitamin A activity. Also the acid was not active.

Our ketone is a thick yellow oil. Condensation with ethyl bromoacetate yields an ester which has a very strong biological activity. Also the acid is very active (c. f. copending application No. 645,698), now abandoned.

It follows therefore, that Heilbron's synthesis of the "C₁₈-ketone" was fallacious. This is further borne out by Heilbron's own statement, that his starting material, thought to be β-ionylidene ethanal (R=CH—CHO), had an absorption spectrum entirely different from that expected, and so it must be concluded that his material was a different compound (see Heilbron in Vitamines and Hormones, 1944, p. 180).

Our ketones have been obtained from the acids R″=X—COOH, in which R″ represents the β-ionylidene group or a group which may be easily converted into the β-ionylidene group, and X has the same meaning as above, by reacting the acid or a functional derivative thereof, such as a halogenide, an ester, the amide, the nitrile, a salt, etc. with an organo-metallic compound. As such we used a methyl magnesium halogenide and methyl lithium, but others may be used as well.

The following examples may serve as an illustration of the invention. It is to be understood, however, that the invention is not limited thereto, but may be varied within the scope of the appended claim.

Example 1.—"C₁₆-ketone"

Into a 500 cc. round bottomed flask, provided with mechanical stirrer, dropping funnel, reflux condenser and gas inlet tube, 4.6 g. of finely cut lithium and 100 cc. of absolute ether are introduced while passing through pure nitrogen gas. Then a solution of 47 g. of methyliodide in 100 cc. of abs. ether is added in about 3½ hours. The stirring is continued for an hour, after which the mixture is diluted with 200 cc. of abs. ether and left for sedimentation during 15 minutes.

The solution of methyl lithium, which is obtained, is pressed by way of a syphon filled up with glass wool for filtering purposes into a second flask, which has been previously filled with nitrogen gas and which has a capacity of 2 liters and is likewise provided with a mechanical stirrer, dropping funnel, reflux condenser and gas inlet tube.

To the clear methyl lithium solution a solution of 22.0 g. of ionylidene acetic acid (obtained by Reformatzky condensation of β-ionone with ethyl bromoacetate under the influence of zinc, followed by dehydration with anhydrous oxalic acid and saponification) in 800 cc. of abs. ether is slowly added. A reaction immediately sets in. After decomposition with ice water, drying and evaporation of the ether layer the residue is distilled in vacuo, after which 16.5 g. of a yellow oil, boiling between 90° and 100° C./0.001 m. m. are obtained. It is a ketone with the general formula $C_{16}H_{24}O$, which corresponds to the structural formula

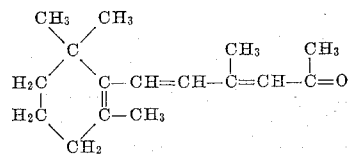

It is purified via the semicarbazone. The recovered pure ketone after vacuum distillation is a pale yellow oil, B. P. 104°–107° C./0.01 m. m.

The semicarbazone melts at 159.5°–160.5° C. and has a $\lambda_{max} = 310$ mμ.

*Example 2.—"$C_{18}$-ketone" by condensation of ionylidene crotonic acid with methyl lithium*

As in Example 1 a solution of methyl lithium is prepared. To this a solution of 23.0 g. of crystalline ionylidene crotonic acid (obtained by Reformatzky condensation of β-ionone with methyl γ-bromocrotonate under the influence of zinc, followed by saponification of the dehydrated ester) in 900 cc. of abs. ether is added, while stirring, in about 25 minutes. The reaction is instantaneous. The reaction product is decomposed with ice water. The ether layer is washed till free from alkali, dried with anhydrous sodium sulphate, after which the ether is distilled off. As a residue 23 g. of the practically pure "$C_{18}$-ketone" is obtained. The empirical formula of this ketone is $C_{18}H_{26}O$ and the structural formula

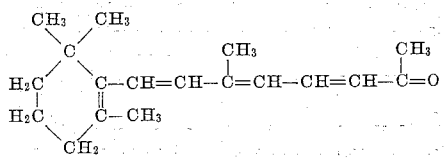

It is a pale yellow liquid, boiling between 137° and 140° C. at a pressure of 0.01 m. m. which with semicarbazide gives a very pale yellow semicarbazone, M. P. 188.6°–189.6° C. (corr.), and $\lambda_{max} = 347$ mμ.

*Example 3.—"$C_{18}$-ketone" by condensation of ionylidene crotonamide with methyl magnesium bromide*

To a solution of methyl magnesium bromide, which has been prepared from 6.0 g. of magnesium, in 100 cc. of dibutyl ether a solution of 28 g. of ionylidene crotonamide, prepared by reacting methyl ionylidene crotonate with ammonia) in dibutyl ether is added. The mixture is heated in an atmosphere of nitrogen under reflux until the Gilman test (vide J. Am. Chem. Soc. 47, 2406 (1925)) to Grignard compounds has become negative.

The reaction mixture is poured out on ice and diluted hydrochloric acid, the ether layer is separated, washed with water, sodium bicarbonate solution and again with water. After drying with anhydrous sodium sulphate the ether is distilled off in vacuo. The residue is treated with Girard reagent P and the ketonic fraction is distilled in a high vacuum. The same product as described in Example 2 is obtained.

*Example 4.—"$C_{21}$-ketone"*

In an analogous way as described in Example 2 the ketone $C_{21}H_{30}O$, which possesses the structural formula

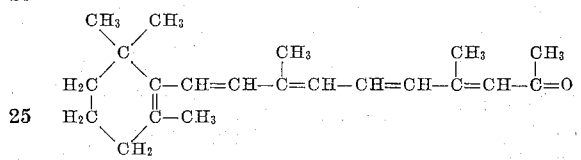

is obtained by reacting "vitamin A acid" which has the structural formula of vitamin A except that the methanol group is replaced by a carboxyl group, (the preparation of which is described in the copending application No. 645,698) with methyl lithium.

The ketone $C_{21}H_{30}O$ is a yellow oil, forming a semicarbazone which melts at 190°–191° C. (corr.). The ketone, when biologically tested, possesses vitamin A activity.

What we claim is:

A process for the manufacture of the unsaturated ketone having the structural formula

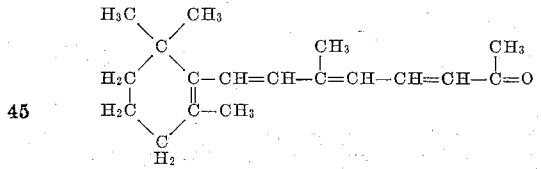

from a compound having the structural formula

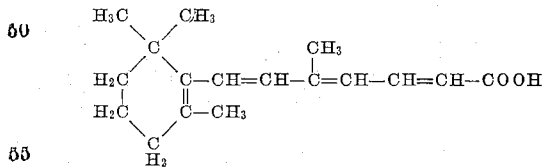

comprising reacting said compound with methyl lithium, and thereafter hydrolyzing the resulting addition product.

DAVID ADRIAAN van DORP.
JOSEF FERDINAND ARENS.

REFERENCES CITED

The following references are of record in the file of this patent:

Karrer et al., Helv. Chim. Acta 17, 3–7 (1934).
Heilbron et al., Jour. Chem. Soc., London, 1936, 561–63.
Heilbron et al., Jour. Chem. Soc., London, 1939, 1554–56.
Heilbron et al., Chem. Soc. Jour. (1942), pages 727–737.